(No Model.)

A. LOCKER.
ATMOSPHERIC GAS BURNER FOR HEATING PURPOSES.

No. 364,270. Patented June 7, 1887.

WITNESSES:
C. F. Kilby
W. Farquhar

INVENTOR
Alfred Locker
BY
E. P. Jennert
ATTORNEY

UNITED STATES PATENT OFFICE.

ALFRED LOCKER, OF NEW YORK, N. Y., ASSIGNOR TO THE E. P. GLEASON MANUFACTURING COMPANY, OF SAME PLACE.

ATMOSPHERIC-GAS BURNER FOR HEATING PURPOSES.

SPECIFICATION forming part of Letters Patent No. 364,270, dated June 7, 1887.

Application filed May 14, 1886. Serial No. 202,155. (No model.)

*To all whom it may concern:*

Be it known that I, ALFRED LOCKER, a citizen of the United States, and a resident of the city of New York, county and State of New York, have invented a new and useful Improvement in Atmospheric-Gas Burners for Heating Purposes, of which the following is a specification.

My invention relates to such gas-burners as are commonly called "Bunsen burners," and has for its object cheapening the cost of manufacture and providing a convenient way for securing its parts together, as will more fully appear, reference being had to the accompanying drawings, in which—

Figure 1:
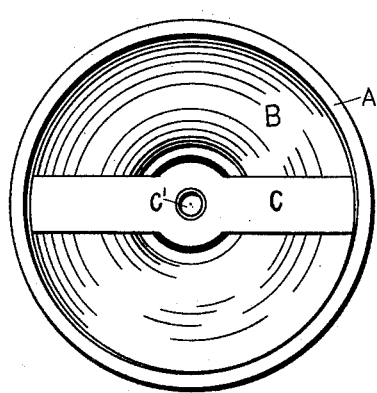
Figure 2:
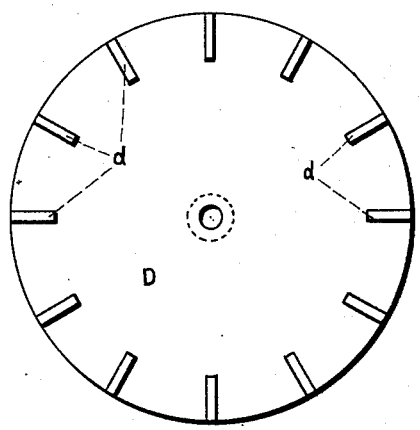
Figure 4:
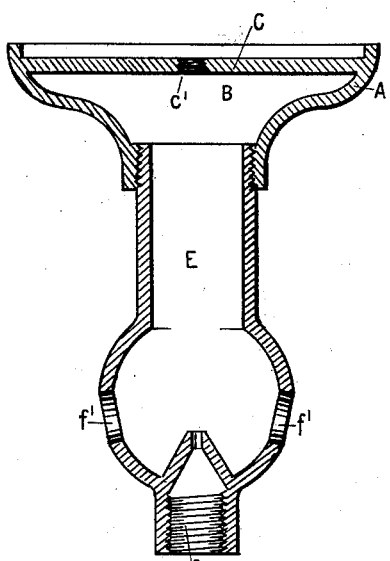
Figure 3:
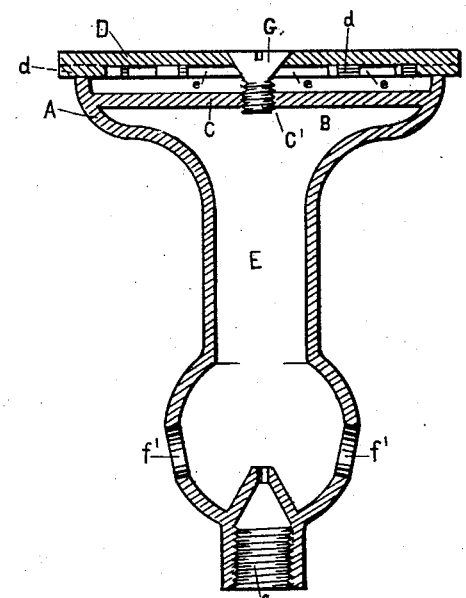

Figure 1 is a plan view with the top plate off; Fig. 2, a view of the under side of the top plate. Fig. 3 is a longitudinal central section. Fig. 4 is a similar section without the top plate.

Like letters designate like parts.

The bowl or casing A, inclosing the mixing and generating chamber B, has a bar, C, joined to each of its opposite inner sides and crossing the chamber diametrically. In the center, and concentric with the bowl B, the bar C is pierced with a hole which is threaded to receive the screw G, which, as is shown at C', Fig. 3, passes through the top plate, D, the center of which is pierced with a suitable hole. The top plate, D, is provided on its under side with short radial ribs d d, extending inward from its circumference. These ribs d d serve to raise the disk or body of the top plate, D, off the rim of the bowl A, on which they rest, thus forming openings e e, through which the atmospheric gas may issue, and from which it will, when lighted, rise in a non-luminous flame.

The tube or shank E may be made of any desired length and form, and provided at its base with a nipple, f, and any suitable means of attaching a gas-pipe. In its sides, about opposite to the point of the nipple f, openings f' are made for the admission of air.

In operation the gas supplied passes in through the nipple f, and as it rushes onward through the shank E air is drawn in through the openings f', which mingles thoroughly with the gas in the chamber B and issues through the openings e e as atmospheric gas.

In the manufacture of these atmospheric-gas burners it is designed to cast the bowl A and bar C in one piece, or possibly the nipple f, shank E, bar C, and bowl A all in one piece, as shown at Fig. 3.

Having thus described my invention, what I claim as new, and desire to secure by Letters Patent, is—

1. An atmospheric-gas burner consisting of the gas-inlet nozzle f, mixing-chamber E, having air-inlets f', bowl B, and cross-bar C, all cast in one piece, in combination with a plate, D, and screw C', substantially as described.

2. An atmospheric-gas burner, consisting of a gas-inlet nozzle, f, mixing-chamber E, having air-inlets f', bowl B, and cross-bar C, combined with a plate, as D, to which it is connected by means of screw C', substantially as set forth.

In testimony that I claim the foregoing as my invention I have signed my name, in presence of two witnesses, this 27th day of March, 1886.

ALFRED LOCKER.

Witnesses:
C. F. KELLEY,
D. J. SHEA.